Patented Feb. 14, 1928.

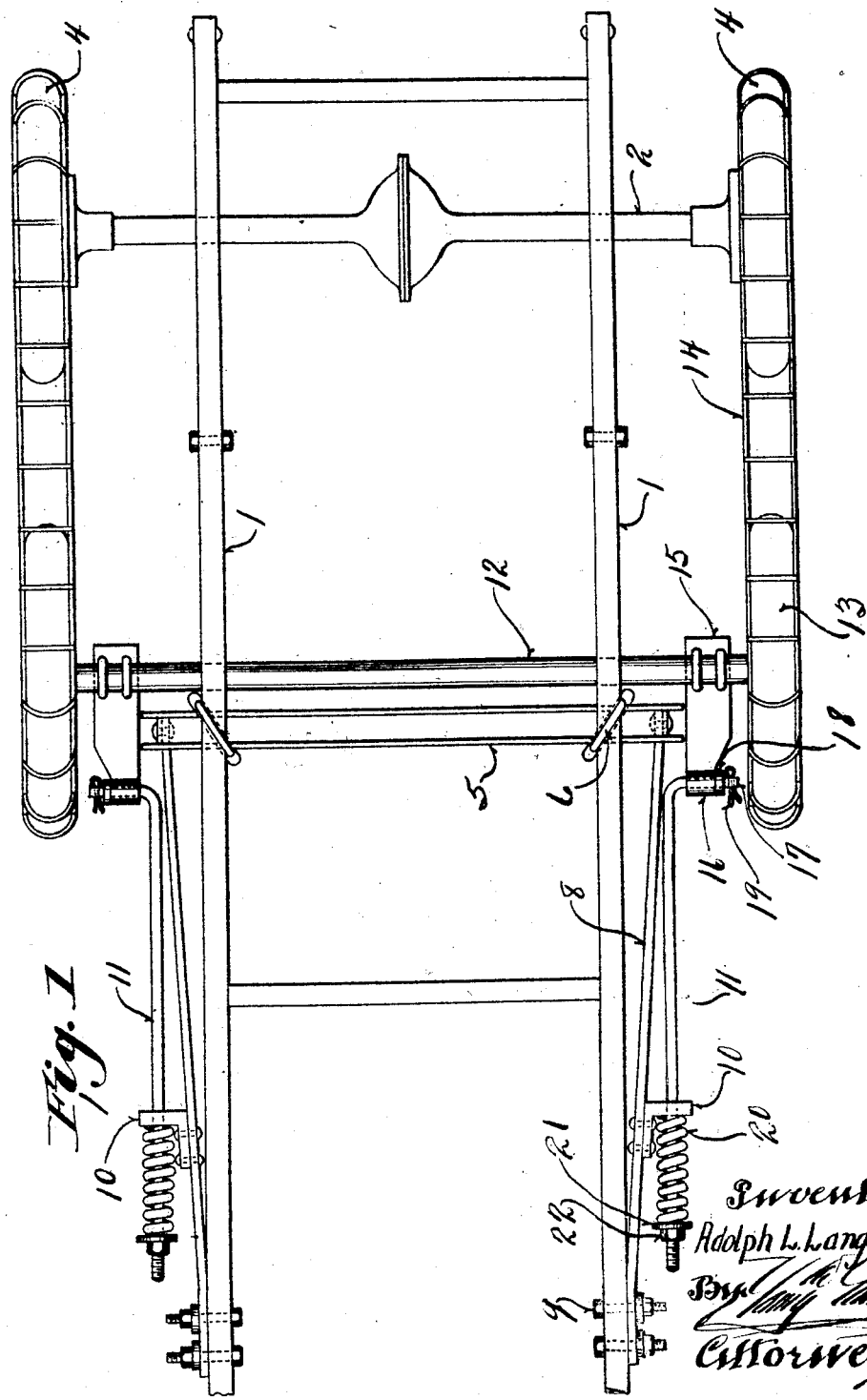

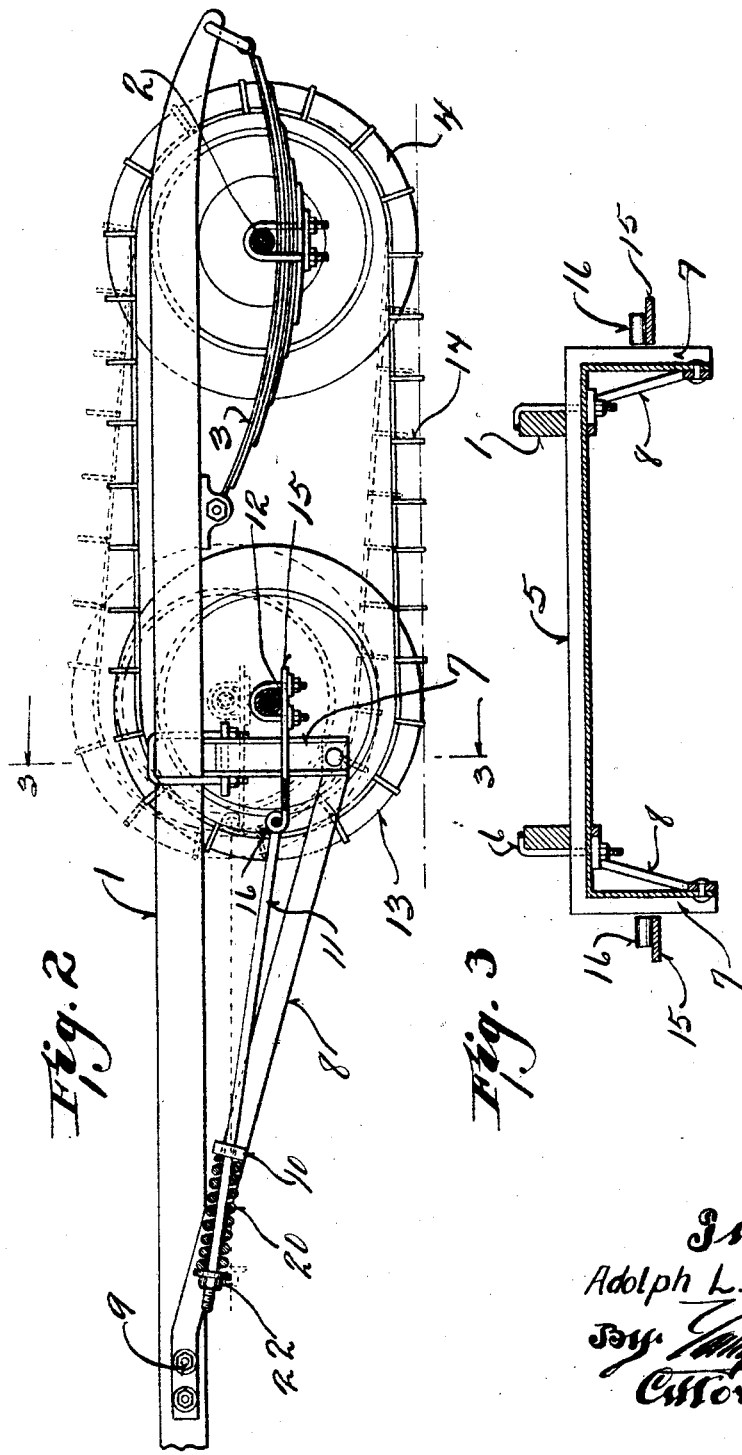

1,659,297

UNITED STATES PATENT OFFICE.

ADOLPH L. LANGENFELD, OF NEW HOLSTEIN, WISCONSIN.

VEHICLE-PROPELLING MECHANISM.

Application filed February 14, 1927. Serial No. 168,006.

This invention relates to a mechanism for driving a vehicle and is particularly directed to a driving mechanism for propelling the vehicle over snow or other irregular and yielding footings.

Various attempts have been made to provide an attachment for an automobile which will adapt it for travel through snow or sand and which will provide chains or belts for extending the surface gripping area of the driving wheels, but these attempts have not been satisfactory for several reasons, among which may be mentioned the fact that these devices permit slackening of the chains when the auxiliary wheels or mechanism for carrying the chains is displaced and thus at the very time when the maximum traction between the driving wheels and the chains is needed, the chains become slackened and the wheels slip within the chains and traction is thus lost.

This invention is designed to overcome the above noted defects and objects of such invention are to provide a driving mechanism for a vehicle which is so constructed that auxiliary chains are provided and are carried by means insuring the tension of the chains under all conditions of displacement and under all positions assumed by the auxiliary wheels and floating axle, so that the device will not lose its traction between the driving wheels and the chains, irrespective of the position assumed by the auxiliary wheels.

Further objects are to provide a device which may be readily attached to standard automobiles with a minimum of change, and which is a unit in itself adapted, as stated, for attachment to standard vehicles and so constructed that it has the utmost simplicity and strength.

An embodiment of the invention is shown in the accompanying drawings in which:

Figure 1 is a plan view of the side frames of an automobile with the device in place;

Figure 2 is a side elevation of the structure shown in Figure 1 with parts in section;

Figure 3 is a transverse sectional view on the line 3—3 of Figure 2, the auxiliary wheels and chains being omitted.

Referring to the drawings, it will be seen that the side frame bars 1 of an automobile have their rear ends connected to the rear axle 2 by means of springs 3. These rear axles carry the driving wheels 4 in the usual manner and this portion of the mechanism of the automobile is undisturbed in applying the attachment thereto.

The attachment comprises an auxiliary frame having a transverse portion 5 bolted in any suitable manner, as indicated at 6, for instance, to the side frames 1. This member 5 is provided with downwardly extending guides 7 (see Figures 2 and 3) and it is to be noted that these guides as well as the portion 5 are preferably formed of channel iron. The auxiliary frame further includes a pair of forwardly and inwardly slanting braces 8 which have their forward ends secured in any suitable manner, as by means of the bolts 9 to the side frame bars 1. These forwardly extending braces carry guiding clips or ears 10 which are apertured for the reception of rods 11 for a purpose hereinafter to appear.

The device comprises an auxiliary floating axle 12 which is mounted in front of the rear axle 2, as shown, and which is provided with auxiliary wheels 13. Chains 14 pass over the auxiliary wheels 13 and the driving wheel 4. These chains may be of any suitable type to secure a grip upon the snow, sand, or other irregular and insecure footing over which the vehicle is adapted to travel. Preferably, the chains are so made that they will cooperate with the usual or standard tires carried by the wheels.

The auxiliary axle is provided with a pair of rigidly attached members 15 which extend forwardly and are provided with bearing portions 16 which receive angularly outwardly turned rear arms or ends 17 of the rods 11. The rods are secured against displacement in any suitable manner as, for example, by means of the washers 18 and split pins 19, although obviously other constructions could be used.

The forward ends of the rods pass through the stationary guides or clips 10, as previously stated, and relatively heavy helical springs 20 loosely surround the forwardly projecting portions of the rods. The extreme ends of the rods 11 are threaded and receive washers 21 and nuts 22, whereby the compression of the spring 20 may be adjusted as desired. It will be noted that the springs 20 bear at their rear ends against the clips 10 and at their forward ends against the washers or nuts carried by the rods 11. Consequently, the rods 11 are spring urged forwardly and impart this tension to the floating axle 12. This floating axle, it will be noted, is thus at all times urged forwardly and thus maintains the belts 14 tight.

The floating axle is adapted to adjust itself to irregularities in the snow or other footing, but is restrained against lateral motion by the auxiliary frame members 7, which, it will be noted, are positioned inside of the members 15, as shown most clearly in Figure 3. Thus, although the auxiliary member may float and tilt as needed, nevertheless it is restrained against lateral motion.

When it is considered that the vehicle travels over irregular and yielding surfaces, it will be appreciated that considerable adjustment of the auxiliary axle and auxiliary wheels must take place. With the prior types of devices the auxiliary or floating axle can move to a certain extent, but when it does move, it slackens the tension of the driving chain at the very time when the maximum tension is desired, as in riding over obstructions or rises in the snow. However, with this invention the chains are maintained tight under all positions assumed by the floating axle and, consequently, maximum traction is afforded between the driving wheels and the chains under all conditions, particularly when riding over an obstruction or rise in the snow. For example, when the auxiliary axle and the auxiliary wheels move into the dotted line position shown in Figure 2, the springs 20 are compressed to a greater extent than normally, and consequently, the tension of the chains is increased and the maximum traction is obtained at this time when it is most needed. Therefore, there can be no slipping between the driving wheels and the chains.

It will be seen that the device is an entity in itself and may be attached as a unit to a standard type of automobile, necessitating a minimum of change for its application. For example, in the particular form illustrated, all that is needed is to drill a few holes for the reception of the bolts 9. Otherwise, the structure of the automobile is unchanged. Obviously, other means could be employed in place of the bolts 9 so that this drilling operation could be avoided.

It is clear, however, that the device, is very readily attached to a standard automobile and that it will function in a novel and effective manner and maintain the tension of the chains under all conditions.

Although the invention has been described in considerable detail, such description is intended as illustrative rather than limiting as the invention may be variously embodied and as the scope of such invention is to be determined as claimed.

It is intended that the expression "chains" be construed to cover chains, belts, or other flexible members of this general type.

I claim:

1. In a vehicle, the combination of a pair of side frame bars, a pair of rear driving wheels supporting the rear portion of said bars, an auxiliary frame secured to said bars, a floating axle restrained from lateral motion by said auxiliary frame, a pair of auxiliary wheels carried by said floating axle, chains passing over said driving wheels and said auxiliary wheels, a pair of stationary guides mounted forwardly of said floating axle, a pair of forwardly extending rods attached to said floating axle at their rear ends and passing through said guides, and springs for urging said rods forwardly.

2. In a vehicle, the combination of a pair of side frame bars, a pair of rear driving wheels supporting the rear portion of said bars, an auxiliary frame secured to said bars, a floating axle restrained from lateral motion by said auxiliary frame, a pair of auxiliary wheels carried by said floating axle, chains passing over said driving wheels and said auxiliary wheels, a pair of stationary guides mounted forwardly of said floating axle and carried by said auxiliary frame, a pair of forwardly extending rods attached to said floating axle at their rear ends and passing through said guides, and springs for urging said rods forwardly.

In testimony that I claim the foregoing I have hereunto set my hand at New Holstein, in the county of Calumet and State of Wisconsin.

ADOLPH L. LANGENFELD.